US010127316B2

(12) United States Patent
Lee-Goldman et al.

(10) Patent No.: US 10,127,316 B2
(45) Date of Patent: Nov. 13, 2018

(54) IDENTIFYING AND PROCESSING RECOMMENDATION REQUESTS

(71) Applicant: Facebook, Inc., Menlo Park, CA (US)

(72) Inventors: Russell Lee-Goldman, Oakland, CA (US); Lada Ariana Adamic, Mountain View, CA (US); David M. Goldblatt, Redwood City, CA (US); Yuval Kesten, San Francisco, CA (US); Mark Andrew Rich, Redwood City, CA (US); Nidhi Gupta, Mountain View, CA (US); Amy Campbell, San Francisco, CA (US); Andrew Rocco Tresolini Fiore, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 632 days.

(21) Appl. No.: 14/455,798

(22) Filed: Aug. 8, 2014

(65) Prior Publication Data
US 2016/0042069 A1    Feb. 11, 2016

(51) Int. Cl.
*G06F 17/30*      (2006.01)
*G06Q 50/00*      (2012.01)
*G06F 17/27*      (2006.01)

(52) U.S. Cl.
CPC ...... *G06F 17/30864* (2013.01); *G06F 17/278* (2013.01); *G06F 17/3043* (2013.01); *G06Q 50/00* (2013.01)

(58) Field of Classification Search
CPC ............. G06F 17/30864; G06F 17/278; G06F 17/3043; G06Q 50/00
USPC ....................................................... 707/706
See application file for complete search history.

(56) References Cited

U.S. PATENT DOCUMENTS

| | | | | |
|---|---|---|---|---|
| 8,180,804 | B1 * | 5/2012 | Narayanan | G06F 17/30867 707/798 |
| 8,862,622 | B2 * | 10/2014 | Zivkovic | G06F 17/278 707/780 |
| 9,411,907 | B2 * | 8/2016 | Kimberlin | G06F 17/30976 |
| 9,443,224 | B2 * | 9/2016 | Dunn | G06Q 10/10 |
| 2007/0078884 | A1 * | 4/2007 | Ott, IV | G06F 17/30864 |
| 2010/0153404 | A1 * | 6/2010 | Ghosh | G06F 17/30699 707/748 |
| 2011/0258042 | A1 * | 10/2011 | Purvy | G06Q 30/02 705/14.49 |

(Continued)

*Primary Examiner* — Thanh-Ha Dang
(74) *Attorney, Agent, or Firm* — Baker Botts L.L.P.

(57) ABSTRACT

In one embodiment, a method includes receiving unstructured text from a user of a social-networking system, determining whether the unstructured text includes a request for a recommendation, identifying one or more first entity names in the unstructured text, generating a structured query based upon the one or more first entity names, identifying, in the social graph, one or more second entity names corresponding to the structured query, and presenting the one or more second entity names and the unstructured text in a social context of the user. The unstructured text may include text of a post or message generated by the user on a social-networking system. A score may be generated based on the unstructured text to determine whether the text includes a request for recommendation using a machine-learning model based on comparison of the unstructured text to the one or more predetermined words associated with requests for recommendation.

35 Claims, 8 Drawing Sheets

(56) References Cited

U.S. PATENT DOCUMENTS

| | | | | |
|---|---|---|---|---|
| 2012/0158720 A1* | 6/2012 | Luan | ............... | G06F 17/30867 707/732 |
| 2012/0223951 A1* | 9/2012 | Dunn | ................... | G06Q 10/10 345/467 |
| 2012/0240030 A1* | 9/2012 | Shriber | ............ | G06F 17/30867 715/234 |
| 2013/0054631 A1* | 2/2013 | Govani | ............ | G06F 17/30867 707/767 |
| 2013/0124504 A1* | 5/2013 | Haugen | ............ | G06F 17/30864 707/722 |
| 2013/0132445 A1* | 5/2013 | Koppenhagen | ........ | G06Q 10/06 707/810 |
| 2013/0191416 A1* | 7/2013 | Lee | ................. | G06F 17/30979 707/771 |
| 2014/0188899 A1* | 7/2014 | Whitnah | .......... | G06F 17/30646 707/749 |
| 2014/0250177 A1* | 9/2014 | Sohn | ............... | G06F 17/30867 709/204 |
| 2014/0365484 A1* | 12/2014 | Freeman | ............... | H04W 4/21 707/736 |
| 2017/0103127 A1* | 4/2017 | Hanson | ............ | G06F 17/30864 |

* cited by examiner

600

| Regular Expressions |
|---|
| check (it out\|my\|out\|this) |
| follow |
| (email\|write\|text\|txt\|tweet\|send)( to\| at)?( me)? |
| (any one\|any1\|anyone\|anybody\|any body\|nebody\|ne1) |
| \bplease\b |
| (opinions\|ideas\|info\|thoughts)\? |
| (suggest\|recommend)[^\.]*\? |
| (any one\|any1\|anyone\|anybody\|any body\|nebody\|ne1)s+(interested\|wanna\|want to\|know\|have) |
| (wanna\|want to) |
| (should\|shud\|would\|wud\|shall\|can\|could\|am) i |
| \bhow\b, \bpray\b, \bpray\b |
| (today\|2day\|tomorr\|tmrw\|2morr\|tonight\|tonite\|2nite) |
| let'?s (go\|do\|head\|try\|meet) |
| join (us\|me) |
| who('s\|\\s+is)? (down\|going\|in) |
| (message\|inbox)( to)?( me)? |
| hit (the\|me\|my\|it) |
| comment |
| (what\|wut\|wat)( is\|'s\|s\|z\| r\| are\|'re\| do\| u\| you\| yhu\|chu\| chu\|cha) |
| when('s\|s\| is\| are\| will\| would\| wud\| do\| does\| could\| might\| can\| shall\| was\| should\| shud) |
| \bwhere\b |
| "(going out\|hang out\|who..?s in\|who..?s down\|who wants to\|anyone interested in\|who feels like\|let.s\|is anyone\|join us\|join me\|going to the \|going to [A-Z])[^\\.]*\\? |

*FIG. 6*

IDENTIFYING AND PROCESSING RECOMMENDATION REQUESTS

TECHNICAL FIELD

This disclosure generally relates to search queries within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In a social-networking system, a user may post a message containing text that requests a recommendation for a particular type of entity. As an example, a user may post a message such as "What are some good Japanese restaurants in Mountain view?" as a request for recommendations of Japanese restaurants in Mountain View. The user expects such message text to be read by other users, and so writes the text in a natural language such as English. Although the text is not intended as a search engine query, the text may nonetheless be analyzed to determine whether it represents a request, such as a request for recommendations or suggestions. If the text does represent a request, it may be converted to a more structured query suitable for use as input to a search engine. The conversion to a structured query may involve identifying words and phrases in the request that characterize the type of entity for which recommendations are sought. These words and phrases may then be used as search terms in a more structured query that is likely to identify answers to the user's request. The search results for the structured query may be presented as items in the user's social context, e.g., as stories in the user's social network news feed. These news feed items thereby integrate the user's initial request text with the search results, comments by the user's friends, and other information, such as reviews by the user's friends of entities that are relevant to the user's request or match the structured query. The search results may also be presented in notifications, e.g., popup dialog boxes or the like in a user interface.

The embodiments disclosed above are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIG. 6 illustrates example regular expressions that match recommendation requests.

DESCRIPTION OF EXAMPLE EMBODIMENTS

Figure 1:
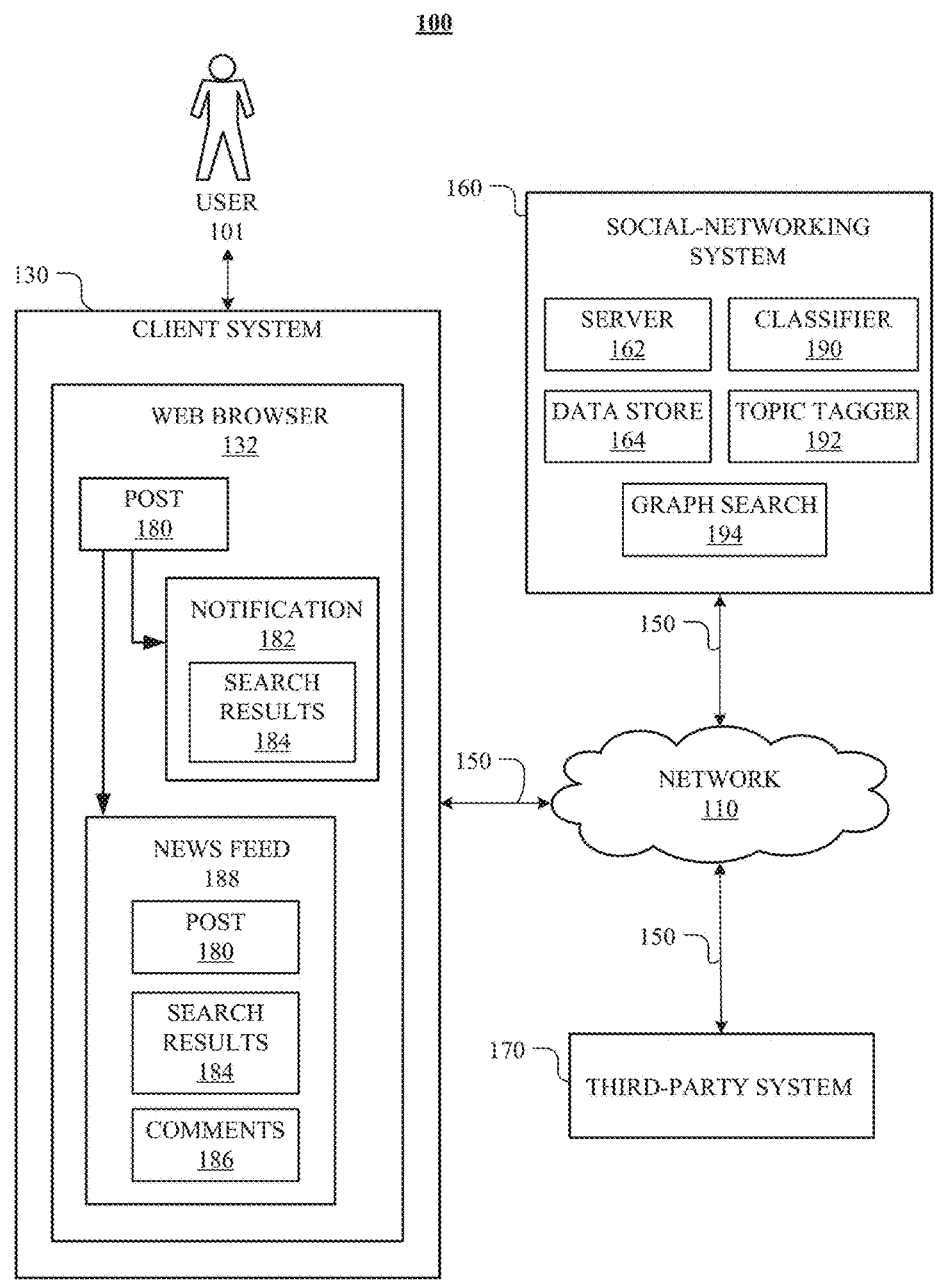
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, social-networking system 160 may include a classifier 190, a topic tagger 192, and a graph search engine 194. These components are described in further detail below.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

In particular embodiments, the web browser 132 may display a social-network user interface, which may include a post 180. The post 180 may be received from the user 101 may contain text that includes a request for recommendations of some type of entity. The social-network user interface may also present a notification 182 showing search results 184 related to the text of the post 180. The search results 184 may include, for example, names of recommended entities that represent potential answers the post's request for recommendations. The social-network user interface may also include a news feed 188 on which the post 180, search results 184, and comments 186 may be displayed.

Figure 2:
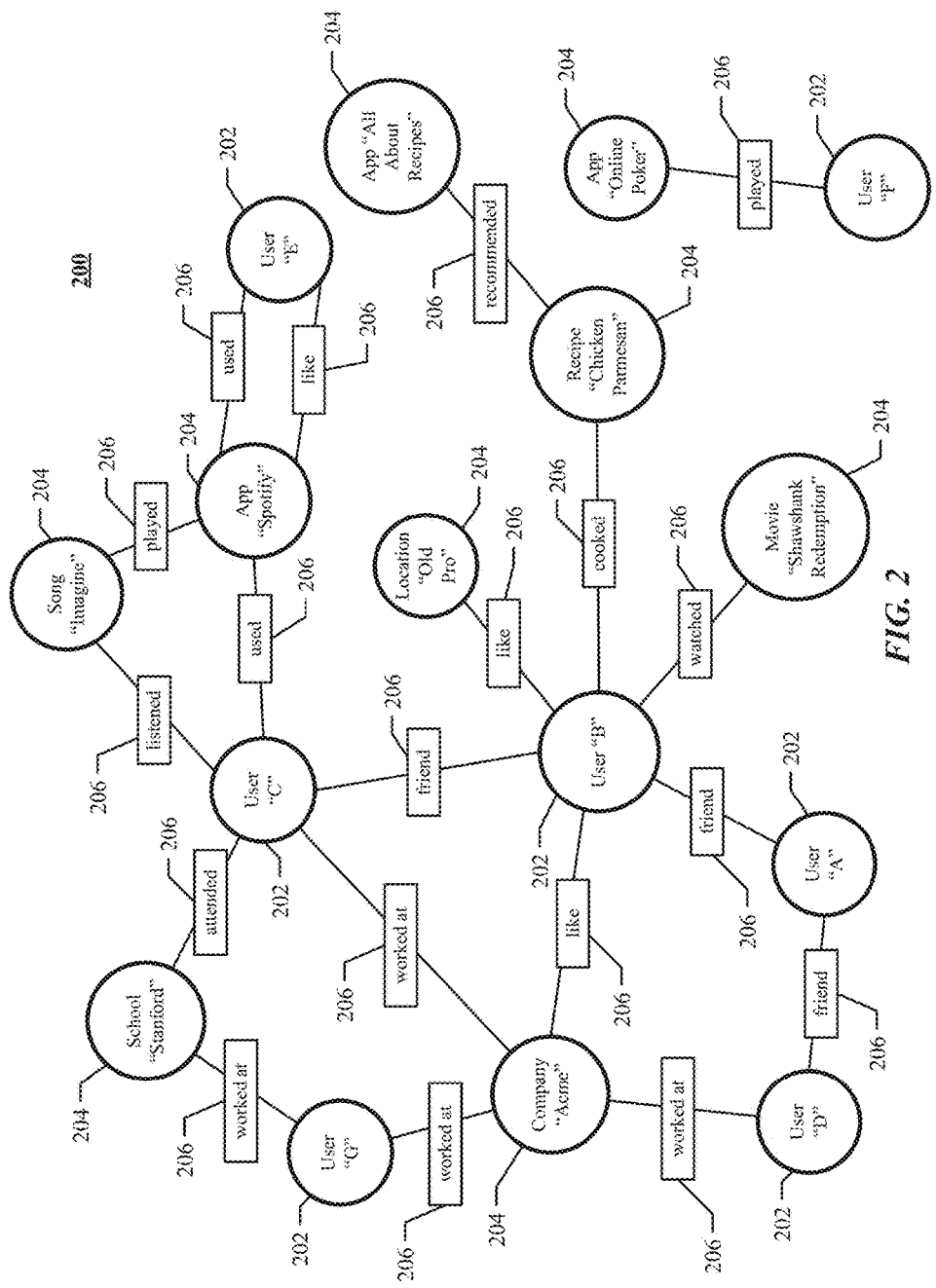
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a first user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a first user registers for an account with social-networking system 160, social-networking system 160 may create a first user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, one or more client-side and/or back-end (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more front-end (client-side) and/or back-end (server-side) typeahead processes (hereinafter referred to simply as "typeahead process") executing at (or within) the social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, the social-networking system 160 can also provide users with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the front-end typeahead process may transmit the entered character string as a request (or call) to the back-end typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also transmit before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) the social-networking system 160.

In particular embodiments, the typeahead process may use one or more matching algorithms to attempt to identify matching social-graph elements. In particular embodiments, when a match or matches are found, the typeahead process may transmit a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

Figure 3:
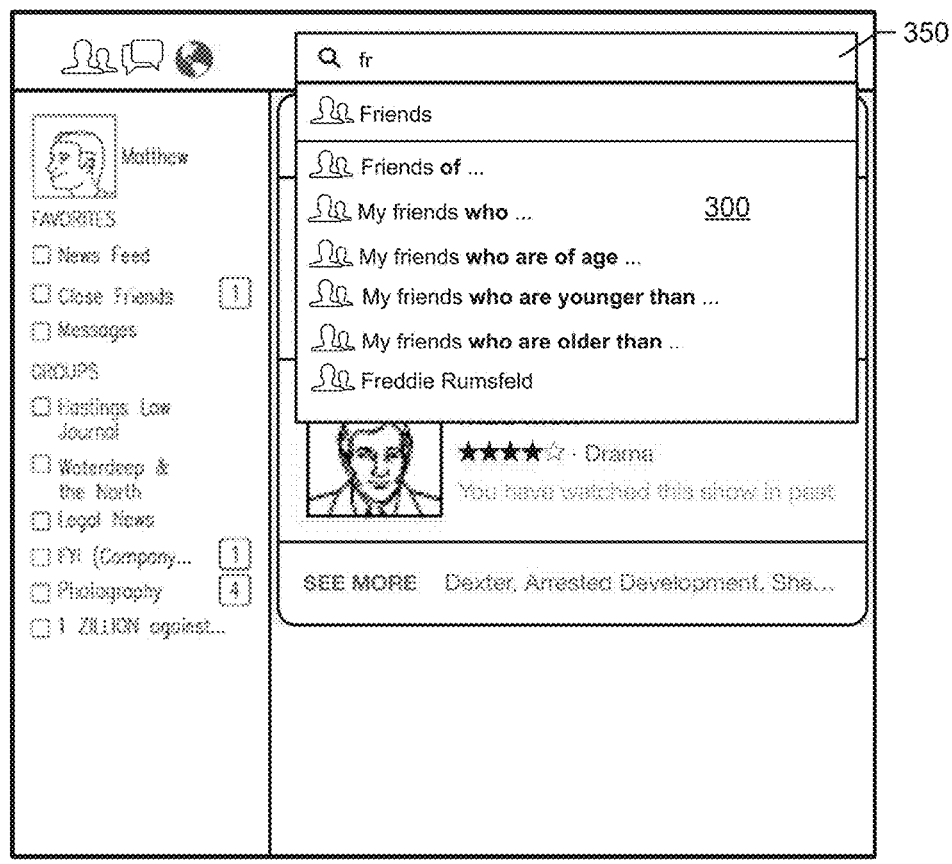
FIG. 3 represents an example search query user interface.

FIG. 3 illustrates an example user interface of an online social network. In particular embodiments, social-networking system 160 may receive from a querying/first user (corresponding to a first user node 202) a search query. The user interface (UI) of a client system 130 may include a search-query field 350 configured to receive the search query from the querying user. In particular embodiments, the UI may be provided by a native application associated with the online social network or by a webpage of the social-networking system accessed by a browser client. The search query may be a text query, and may comprise one or more character strings, which may include one or more n-grams as described below. A user may input a character string comprising one or more characters into query field 350 to search for objects in social-networking system 160 that substantially match the character string. The search query may also be a structured query comprising references to particular nodes or edges from social graph 200. The structured queries may be based on the natural-language strings generated by one or more grammars, as described in U.S. patent application Ser. No. 13/674,695, filed 12 Nov. 2012, and U.S. patent application Ser. No. 13/731,866, filed 31 Dec. 2012, each of which is incorporated by reference. As an example and not by way of limitation, the search query "Friends of Stephanie" may be a structured query, where "Friends" and "Stephanie" in the search query are references corresponding to particular social-graph elements. The reference to "Stephanie" corresponds to a particular user node 202 (where social-networking system 160 has parsed the n-gram "my girlfriend" to correspond with a user node 202 for the user "Stephanie"), while the reference to "Friends" corresponds to friend-type edges 206 connecting that user node 202 to other user nodes 202 (i.e., edges 206 connecting to "Stephanie's" first-degree friends). The search query may be received in any suitable manner, such as, for example, when the user inputs the search query into a query field 350 on a webpage of the online social network, as shown in FIG. 3, or into a native application (not shown) associated with the online social network.

In particular embodiments, social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350. As the querying user enters this text query into query field 350, social-networking system 160 may provide various suggested structured queries and/or typeahead suggestions for matching entries, as illustrated in a drop-down menu 300 or other display area. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query does not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query is not necessarily in the format of a query command that is directly executable by a search engine. For example, the text query "friends stanford" could be parsed to form the query command "intersect (school(Stanford University), friends(me))", which could be executed as a query in a social-graph database. As the querying user enters text query into query field 350, social-networking system 160 may provide typeahead suggestions for matching entries, e.g., a user "Freddie Rumsfeld," for a user matching the typed prefix "fr" in addition to the suggested structured queries. Although this disclosure describes receiving particular queries in a particular manner, this disclosure contemplates receiving any suitable queries in any suitable manner. More information on search queries may be found in U.S. patent application Ser. No. 13/556,060, filed 23 Jul. 2012, and U.S. patent application Ser. No. 13/732,175, filed 31 Dec. 2012, each of which is incorporated by reference.

In particular embodiments, social-networking system 160 may parse the search query received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the search query received from the querying user. In particular embodiments, each n-gram may comprise a character string (e.g., one or more characters of text) entered by the first user. As an example and not by way of limitation, social-networking system 160 may parse the search query "all about recipes" to identify the following n-grams: all; about; recipes; all about; about recipes; all about recipes. In particular embodiments, each n-gram may comprise a contiguous sequence of n items from the search query. Although this disclosure describes parsing particular queries in a particular manner, this disclosure contemplates parsing any suitable queries in any suitable manner. In connection with element detection and parsing search queries, particular embodiments may utilize one or more systems, components, elements, functions, methods, operations, or steps disclosed in U.S. patent application Ser. No. 13/556,072, filed 23 Jul. 2012, U.S. patent application Ser. No. 13/732,101, filed 31 Dec. 2012, each of which is incorporated by reference.

Figure 4:
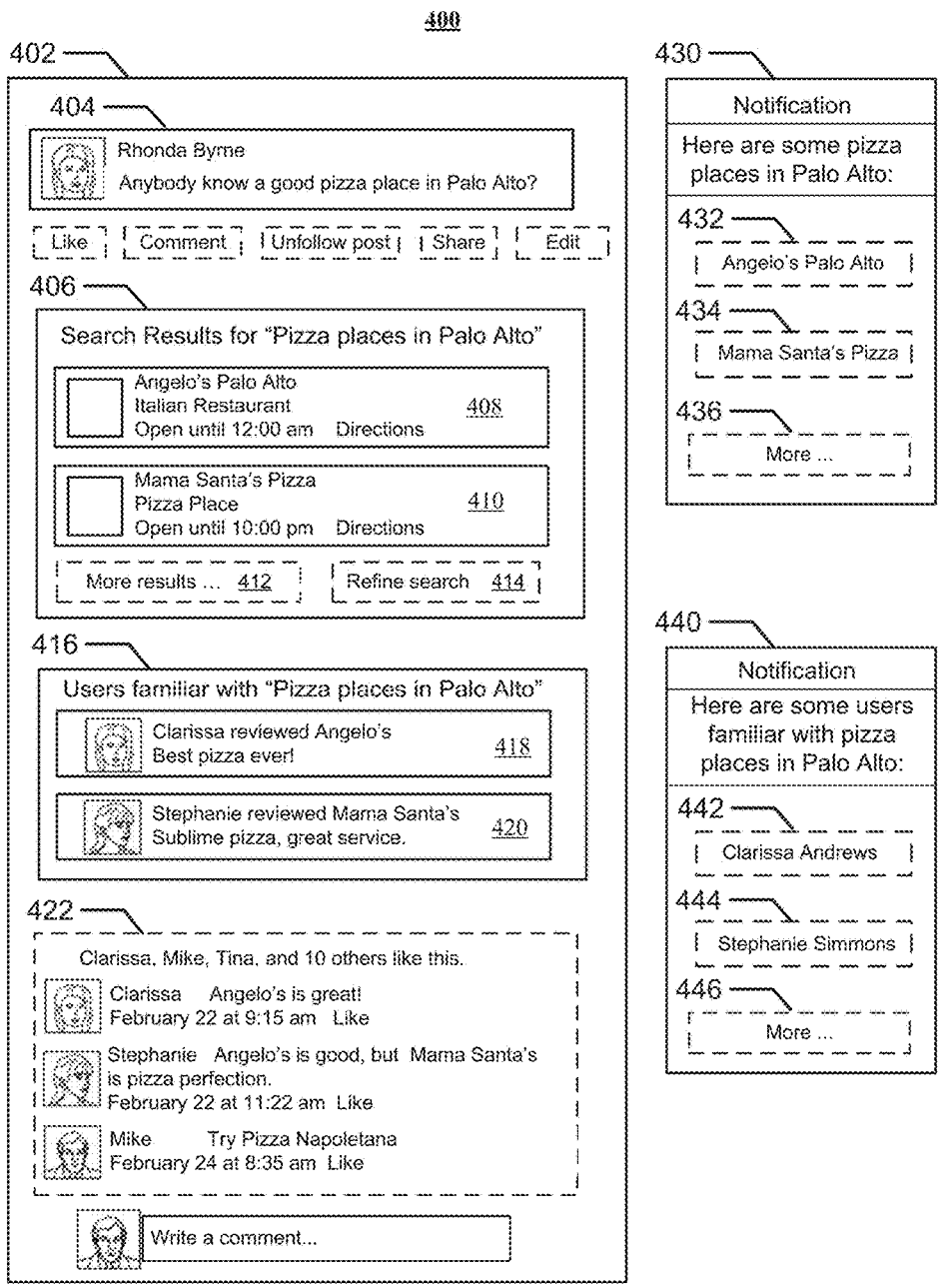
FIG. 4 illustrates an example user interface with search results.

FIG. 4 illustrates an example social-network user interface with search results. In particular, FIG. 4 illustrates a page 400 for a post 404 made by a user, named Rhonda, of the online social network. A news feed 402 may be presented to a user on a display of a computer system by an application such as a web browser. The news feed 402 may be Rhonda's news feed, or the news feed of another user who receives news from Rhonda. In a social-networking system, a user may post a message containing text that requests a recommendation for a particular type of entity. As an example, a user may post a message such as "What are some good Japanese restaurants in Mountain view?" as a request for recommendations of Japanese restaurants in Mountain View. The user expects such message text to be read by other users, and so writes the text in a natural language such as English. Although the text is not intended as a search engine query, the text may nonetheless be analyzed to determine whether it represents a request, such as a request for recommendations or suggestions. If the text does represent a request, it may be converted to a more structured query suitable for use as input to a search engine. The conversion to a structured query may involve identifying words and phrases in the request that characterize the type of entity for which recommendations are sought. These words and phrases may then be used as search terms in a more structured query that is likely to identify answers to the request. The search results for the structured query may be presented as items in the user's social context, e.g., as stories in the user's social network news feed. The search results may be presented in the user's social context, e.g., as stories in the user's social network news feed. These stories thereby integrate the user's initial request text with the search results, comments by the user's friends, and other information, such as reviews by the user's friends of entities that are relevant to the user's request or match the structured query. The search results may also be presented in notifications 430, e.g., popup dialog boxes or the like, in a user interface. The notifications 430 may be presented instead of or in addition to the search results 406 in the news feed 402. Selection of the option 446 may cause the news feed 402 or a web page listing the relevant users to be displayed. In other examples, search results may be presented in other ways, e.g., as text messages in a messaging application or other type of application, as email messages, or as other forms of media, such as audio or video.

In particular embodiments, to determine whether the post represents a request, a classifier trained to recognize requests for recommendations may determine whether the post contains words or phrases in patterns that are known to occur in requests for recommendations. If the classifier returns a value greater than a certain threshold, the post is identified as a request for recommendations. If the post is identified as a request for a recommendation, a social graph search may be performed to find recommended entities that are relevant to the request. The graph search may use a query string that contains entity names extracted from the user's post. The entity names can be, for example, place names, e.g., "Mountain View," and category names, e.g., "Japanese restaurant." The place names are combined into a single query string. In this example, the query string is "Japanese restaurant Mountain View." The query string can be submitted to the graph search typeahead interface, which generates a list of suggested queries. The first suggested query is then selected and used as the search query for a graph search operation.

In particular embodiments, as an alternative, the query can be constructed in a format based on a template for more precise results in specific cases. For example, if one entity is a category, e.g., a dentist, and the other entity is a city, then the query can be constructed by combining the two entity names using a template. The template-based query can be submitted directly to the graph search operation without using the typeahead query generator.

In particular embodiments, if the query operation returns results, they may be presented to the user in an appropriate user interface. The results are, for example, the names of recommended entities, such as Japanese restaurants in Mountain View recommended by other users in the social graph of the user who posted the request for recommendations.

In particular embodiments, to present the results, a notification 430 containing a link 436 to a results page and/or the results 432, 434 may be sent to the user. To provide social context, the special results page can include the post 404 that requested the recommendation, along with any subsequently-received comments from other users, in addition to the search results. Alternatively, the results may be presented inline in the user's news feed 402 with the post 402. Presenting the results 406 in the user's news feed near the post includes the results in the user's social context, so that other users may post comments as responses to the user's initial post and view the search results 406 in the their news feeds 402.

In particular embodiments, the search process may execute for an amount of time that may be perceived as a delay by the user. The search may be performed, therefore, without blocking subsequent user actions, and the user can choose to view the results when the search is complete and the notification 440 is presented. Alternatively, the search may block the user's actions from the time the post 404 is received and displayed until the results are available, and display a message or animation indicating that the search is in progress. Then, when the results become available, they may be displayed in the news feed 402.

The news feed 402 includes news items, also referred to as stories, which may be generated by the social network for Rhonda's user account. Rhonda's post 404 is displayed on the news feed with the post's text: "Anybody know a good pizza place in Palo Alto?" In the example of FIG. 4, the post 404 has been recognized as a request for a recommendation, and the social network has generated search results 406 by constructing and executing a query based on the text of the post 404. The post 404 is recognized as a request for recommendation because it contains the string "Anybody know", which is one of a number of text patterns that signify a request. The query may be constructed by extracting a first set of entities, referred to herein as "topics", from the text of the post 404. For example, a topic tagger trained on a large corpus of topics, such as Wikipedia or the like, may identify the topics "pizza" and "Palo Alto" in the text, and may return metadata associated with these two topics. Therefore, the first entity names identified are "pizza" and "Palo Alto". The metadata may provide type information for the first entity names. For example, metadata for the "pizza" entity may indicate that the entity is a type or category of food, and the metadata for "Palo Alto" may indicate that the entity is a city. After extracting these first entities, a first query may be generated by, in one example, combining the names of the first entities using string concatenation to arrive at the first query "pizza Palo Alto". The first query may be used to generate a second, structured, query, as described below. In other examples, the topic tagger may identify any number of entities that correspond to words or phrases in the unstructured text of the post. Any number of entities may be included in the first query, depending on the particular types of queries that are supported by the implementation. The entities extracted from the topic tagger may be included in the set of first entities subject to a condition, e.g., that the entity type be of a certain type, such as a category, or a category of a kind that is often the subject of recommendations. Another condition may be that one of the entities be a geographic location, and another one of the entities be a category, e.g., food, or the like.

In particular embodiments, the first query may be submitted to a structured-query generator or predictor that refines or expands the first query to generate a more focused query. The structured-query generator may be, for example, part of a predictive typeahead search engine. Given the first query, e.g., "pizza Palo Alto", as input, the structured-query generator generates one or more structured query suggestions, such as "Pizza Places in Palo Alto, Calif.". The suggestions may be ranked by the structured-query generator, with the top-ranked suggestion considered to be the best or most relevant suggestion. In this example, "Pizza Places in Palo Alto, Calif." is the highest-ranked query suggestion generated by the structured-query generator. This structured query identifies the type of entity being searched for (Pizza Places) and their location (Palo Alto, Calif.). The top-ranked query produced by the structured-query generator may therefore be selected as the structured query to be used for identifying answers to the question from the text of the post. In other examples, other queries produced by the structured-query generator may be used in addition to or as alternatives to the highest-ranked query suggestion. Note that the term "structured query" is used herein for explanatory purposes, and is not meant to limit the structured query to a specific type or format of structured query.

In particular embodiments, the structured query may be executed by a graph search engine to identify entities in the social graph that match the query. For example, the structured query "Pizza Places in Palo Alto, Calif." may produce the search results "Angelo's Palo Alto" 408 and "Mama Santa's Pizza" 410 when executed by the graph search engine. Additional search results may be generated, and a threshold number of the search results may be selected for presentation to the user as potential answers to the user's request for recommendations. The search results may have associated relevance values, and search results having relevance values greater than a threshold value may be presented to the user. Although this disclosure describes searching particular data sources in a particular manner, this disclosure contemplates searching any suitable data source in any suitable manner. As an example, and not by way of limitation, the structured and/or unstructured query may be executed by a search engine that searches Internet web sites such as blog sites, review sites, online databases, and the like. The results of such searches may be processed using techniques similar to those described herein for graph search results.

In particular embodiments, as an alternative to using the typeahead search engine, the structured search query may be generated by searching the unstructured text of the post for words or phrases that refer to categories or locations, in which case the category "pizza" and the location "Palo Alto" may be identified in the text. The structured (second) search query may then be constructed using a template of the form "category=X and location=Y". Substituting "pizza" for X and "Palo Alto" for Y, the template may be transformed to the query "category=pizza and location=Palo Alto". In this way, text that requests a recommendation for an entity having a particular category, and associated with a location such as a city, may be identified and converted to a structured query using particular rules and templates. The rule and template technique therefore provides an alternative to invoking the typeahead search engine for text that meets the criteria of the defined rules and templates. For the text of the post 404, the structured queries produced by the typeahead search engine (Pizza Places in Palo Alto, Calif.) and the rule-template technique (category=pizza and location=Palo Alto) both produce the search results "Angelo's Palo Alto" 408 and "Mama Santa's Pizza" 410, which are displayed in the search results panel 406. The structured queries generated by the two techniques described above do not necessarily both produce the same search results for other input queries. The search results identify entities that may be answers to the user's request for recommendations. The search results correspond to social graph entities that referred to herein as second entities and have associated entity names. The search results panel 406 may also include a selectable link 412 with a label such "More results . . . " that a user may select to display additional search results, and a selectable link 414 with a label such as "Refine search" that a user may select to add and/or remove search criteria to/from the structured query.

In particular embodiments, other users may be able to answer or provide advice regarding the question posed in the post 404. These users are referred to herein as "relevant users" for explanatory purposes, and may be identified and presented in a relevant users panel 416 of the news feed 402 as an alternative to or in addition to the search result panel 406. For example, if the user posts the question "What's the best place to eat in Palo Alto?" and a friend of the user has written 50 reviews of several restaurants in Palo Alto, the friend is a relevant user because he/she likely to be able to recommend the best place to eat in Palo Alto. The friend's name is therefore presented in user news item 418 of the relevant users panel 416, along with optional portions such as the friend's photo and excerpts of reviews the friend has written that may be relevant to the user's question. The relevant users are not necessarily limited to the user's friends. For example, non-friend users who have appropriate privacy permissions may be identified as relevant users based upon reviews or other content they have authored. In the example of FIG. 4, two relevant users are identified and presented as users familiar with pizza places in Palo Alto. The relevant users are Clarissa 418 and Stephanie 420, who have both authored reviews of pizza places in Palo Alto. An excerpt from Clarissa's review of Angelo's Palo Alto, "Best pizza ever", is shown in Clarissa's news item 418. Similarly, an excerpt from Stephanie's review of Mama Santa's, "Sublime pizza, great service" is shown in Stephanie's news item 420. The relevant users panel 416 provides an indication that the listed users 418, 428 may be asked for a recommendation regarding the user's question. As an alternative or in addition to displaying the relevant users 416 in the news feed 402, a notification 440 may be generated when the relevant users are identified, and presented to the user, e.g., as a pop-up window, dialog box, or the like. The relevant user notification 440 may include the names of at least some of the relevant users 442, 444, and/or a selectable option 446 such as a "More" link that may be selected to display any additional relevant users that have been identified. Selection of the option 446 may cause the news feed 402 or a web page listing the relevant users to be displayed.

In particular embodiments, the relevant users may include users that are related to the subject matter of the request for recommendations, such as users who have reviewed restaurants that are related to the request for recommendations. For example, the relevant users may include users whose social graph user nodes are connected by a "reviewed" or other type of edge to one or more of the first entities or one or more of the second entities (or to one or more of the first entities and to one or more of the second entities). Referring to the example above in which the first entities are "pizza" and "Palo Alto", the relevant users include users connected to those two topic entities by a "reviewed" edge or a sequence of multiple edges that include a "reviewed edge". For example, a user may be connected to the restaurant "Angelo's Pizza" by a reviewed edge, and "Angelo's Pizza" may be connected to "pizza" and/or "Palo Alto" nodes. This indirect connection between the user node and the topic node(s) identifies the user as being a relevant user, and the restaurant "Angelo's Pizza" as being a potential answer to the request for recommendations. As another example, the relevant users may be connected to the second entities, which may represent particular places such as restaurants. If the second entities are "Angelo's Pizza" and "Mama Santa's", then the relevant users include users whose user nodes are connected by a "reviewed" edge to either of the entity nodes that correspond to those pizza place entities.

In particular embodiments, a graph search query may be performed to identify the relevant users. Such a "relevant-users query" may involve searching the social graph for posts, reviews, or the like, by the user's friends. A score for each friend may be generated based on the number of results (e.g., posts, reviews, or the like) found for the friend. The query may include the names of the search result entities 406 (described above) so that reviews of the search result entities 406 authored by users are counted. Such a query may be "friends who have reviewed Mama Santa's or Angelo's." Alternatively, the relevant user query may be a combination of the query string "friends who have reviewed" and the first query, e.g., "pizza Palo Alto". The query is therefore "friends who have reviewed pizza Palo Alto". This query is likely to identify friends who are familiar with pizza places in Palo Alto. A relevant-users query may also be generated by submitting the identified first entities described above to a query generator along with the query prefix "friends who have reviewed." The query generator may produce a query such as "users who have reviewed Pizza Places in Palo Alto, Calif." Therefore, in one aspect, the relevant users may be identified by identifying one or more authors of one or more reviews of one or more reviewed entities by searching the social graph for user nodes using a query for users who have reviewed the one or more entities in the social graph, such that the one or more reviewed entities are identified based on the structured query. In other embodiments, other types of relations between the friends and the first or second entities, such as "likes", "checked in", "worked at", and so on may be used as alternatives to the "reviewer" relation. Although this disclosure describes searching particular data sources for authors in a particular manner, this disclosure contemplates searching any suitable data source for authors in any suitable manner. As an example, and not by way of limitation, the relevant-users query may be executed by a search engine that searches Internet sites such as blog sites, review sites, online databases, and the like. The results of such searches may be processed using techniques similar to those described herein for graph search results by, for example, extracting user names or identifiers along with the associated reviews (or other content) from the search engine results.

The news feed 402 may include a comments section 422 that displays made by users of the social-networking system. Since the post 404, the search result suggestions 406, and the relevant users 416 are presented in visual association with each other, e.g., adjacent or near each other, users may view the questions and the generated answers and/or relevant users together. The search result suggestions 416 and relevant users 416 may be useful to other users, such as the posting user's friends, who are interested in answers to the request for recommendations posed in the post 404. Users may also comment on the search result suggestions 416 and relevant users 416 by posting comments in the comment section 422. The comments may provide additional suggestions or information about the suggestions 416. The items in the news feed 406, including the suggestions 406 and the relevant users 416, as well as the comments 422, may be viewed by any user who has the appropriate permissions. In one aspect, the items 406, 416, and the comments 422 in the news feed 402 form a social context for Rhonda. The social context may be understood as a collection of social network information associated with a particular user. The items in the social context may be ordered chronologically. The user associated with the social context can ordinarily view any item in the social context, but other users may be restricted to viewing only certain items according to the privacy settings.

Figure 5A:
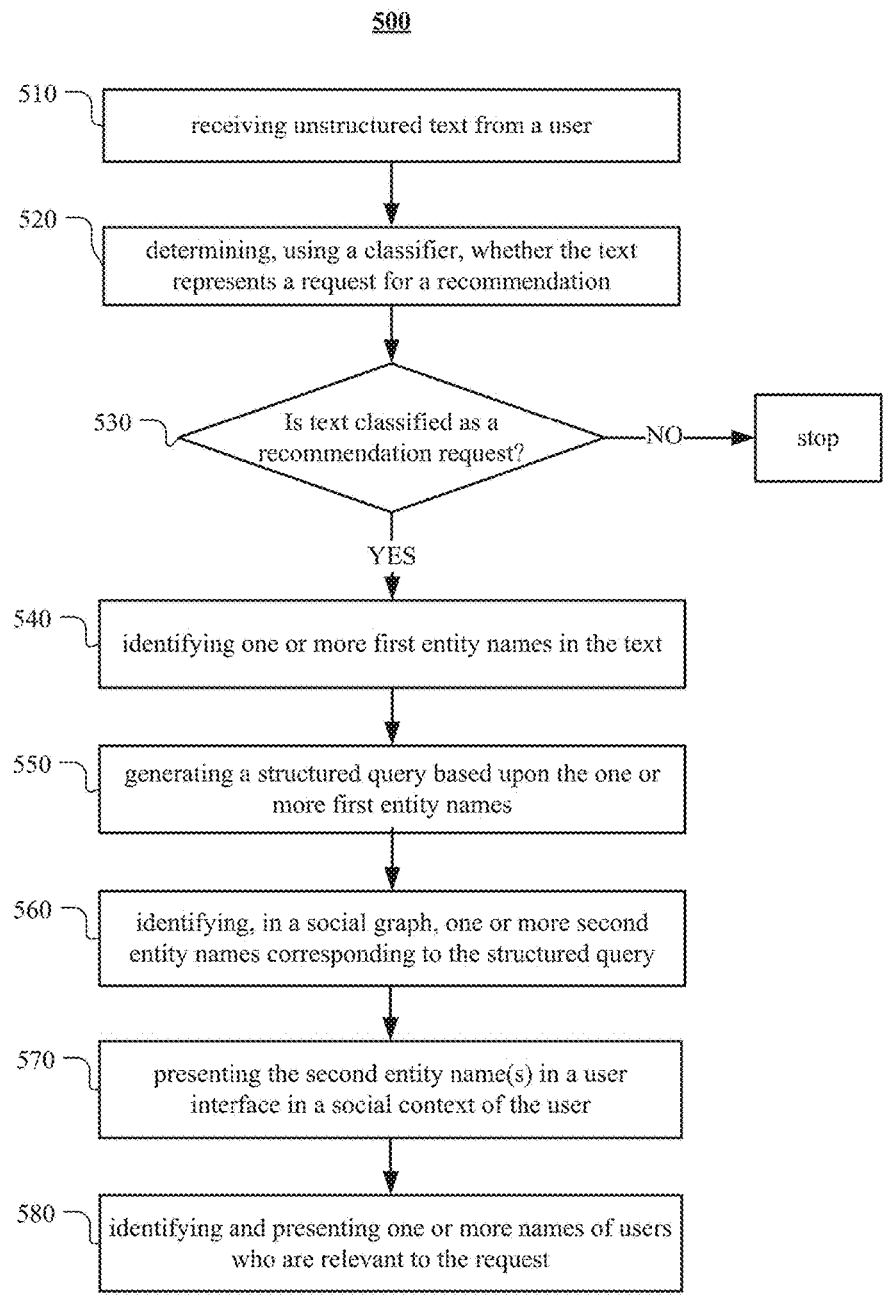
FIG. 5A illustrates an example method for generating and presenting query results in a social-networking system.

FIG. 5A illustrates an example method for generating and presenting query results in a social-networking system. FIG. 5A illustrates an example method 500 for generating and presenting query results in a social-networking system. The method may begin at step 510, where unstructured text such as a post or message is received from a user of the social-networking system. For example, the user may post the unstructured text "Anybody know a good pizza place in Palo Alto?" At step 520, the method determines whether the unstructured text is a request for a recommendation. This determination may be made using a classifier based on a machine-learning model. The classifier may make the determination based at least in part on whether the unstructured text matches one or more natural language words or word patterns that are often present in requests for recommendation. The classifier may perform this comparison of the text to words known to be present in requests for recommendation as part of the scoring process. The unstructured text is considered to be a request for a recommendation when the score is greater than a threshold value. The particular threshold value may depend on the details of the machine-learning model and the classifier. For example, the text "anybody know a good pizza place in Palo Alto?" is recognized as a request for a recommendation because it contains the string "anybody know". The string "anybody know" matches the regular expression pattern "(anybody|anyone|any one) know", which signifies a request as described below with reference to FIG. 6. At step 530, control is transferred to step 540 if the text is a request for a recommendation; if not, the method stops. At step 540, the method may use a topic tagger trained on a corpus of topics such as the Wikipedia online encyclopedia, or the like, to identify one or more first social graph entity names in the unstructured text. The first entity names may be topic names identified in the unstructured query by the topic tagger. For example, the topic tagger may identify the topics "pizza" and "Palo Alto" in the example query, and may return metadata associated with these two topics. The metadata for the "pizza" entity may indicate that the entity is a type or category of food, and the metadata for "Palo Alto" may indicate that the entity is a city.

At step 550, the method generates a structured query based upon the one or more first entity names. The structured query may be formed by combining the one or more first entity names. For example, combining the topics pizza and Palo Alto produces the structured query "pizza Palo Alto", Alternatively, the structured query may be formed by determining whether two of the one or more first entity names are a category name and a city name, and, if so, generating the structured query based on the category name and the city name. For example, the topic tagger metadata indicates that "pizza" is a category of food, and "Palo Alto" is a city, so a structured query may be generated using a template such as "<category> in <city>" to produce the query "pizza in Palo Alto". The generated structured query therefore includes a first constraint that selects an entity having the category name and the city name. As another alternative, the structured query may be generated by submitting the first entity names to a structured-query generator. The structured-query generator may be, for example, part of a predictive typeahead search engine. Given a combination of the first entity names, e.g., "pizza Palo Alto", as input, the structured-query generator may generate one or more structured query suggestions, such as "Pizza Places in Palo Alto, Calif.". The top-ranked query suggestion produced by the structured-query generator may be selected as the structured query to be used for identifying answers to the question from the text of the post. At step 560, the method performs a search of the social graph using the structured query to identify one or more second entities and their associated second entity names in the social graph. The second entity names may correspond to one or more concept nodes in the social graph, e.g., places, restaurants, categories, and so on. The second entities may correspond to social graph nodes that match the structured query. At step 570, the method presents the one or more second entity names, e.g., "Angelo's Palo Alto" and "Mama Santa's Pizza" along with the unstructured text, e.g., "Anybody know a good pizza place in Palo Alto?" in a social context of the user, such as on the user's timeline and/or news feeds of other users. At step 580, the method identifies and presents one or more names of users who are relevant to the request and may be able to provide recommendations. For example, the users Clarissa 418 and Stephanie 420, have both authored reviews of pizza places in Palo Alto, so are therefore relevant to the request, and can be identified as users who may be able to provide recommendations.

Particular embodiments may repeat one or more steps of the method of FIG. 5A, where appropriate. Although this disclosure describes and illustrates particular steps of the method of FIG. 5A as occurring in a particular order, this disclosure contemplates any suitable steps of the method of FIG. 5A occurring in any suitable order. Moreover, although this disclosure describes and illustrates an example method for generating and presenting query results including the particular steps of the method of FIG. 5A, this disclosure contemplates any suitable method for generating and presenting query results including any suitable steps, which may include all, some, or none of the steps of the method of FIG. 5A, where appropriate. Furthermore, although this disclosure describes and illustrates particular components, devices, or systems carrying out particular steps of the method of FIG. 5A, this disclosure contemplates any suitable combination of any suitable components, devices, or systems carrying out any suitable steps of the method of FIG. 5A.

Figure 5B:
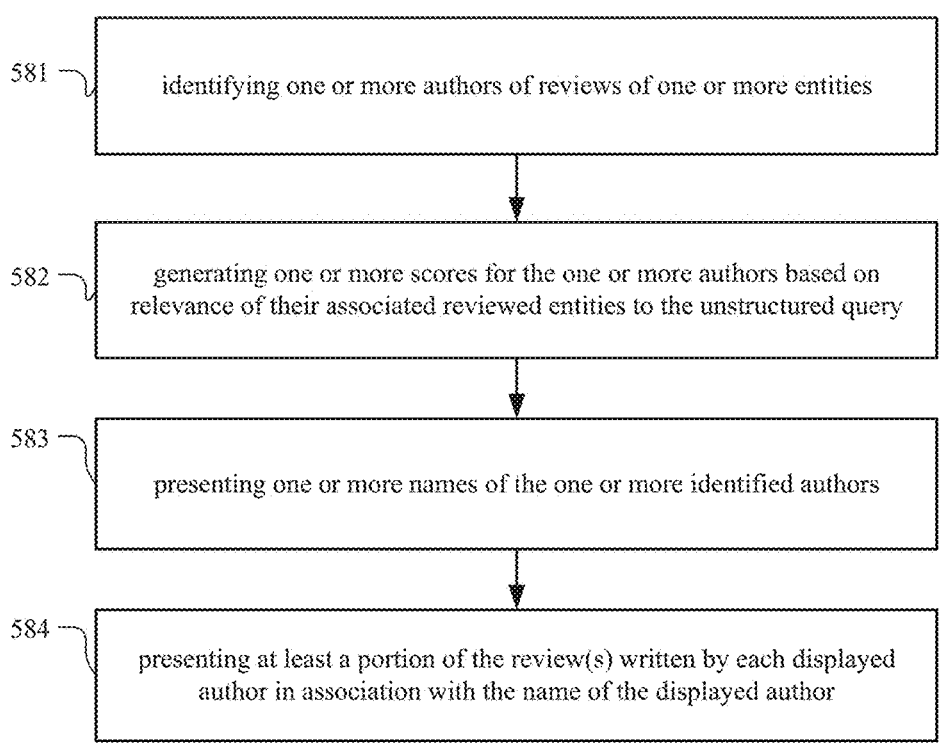
FIG. 5B illustrates an example method for presenting user names associated with content relevant to query results in a social-networking system.

FIG. 5B illustrates an example method for presenting user names associated with content relevant to query results in a social-networking system. The user names are names of relevant users, which are described above. The method may begin at step 581 where one or more authors of reviews of one or more entities are identified. In one aspect, the relevant users may be identified by identifying one or more authors of one or more reviews of one or more reviewed entities by searching the social graph for user nodes using a query for users who have reviewed the one or more entities in the social graph, such that the one or more reviewed entities are identified based on the structured query. In one example, the authors are users of the social network who may be selected from the one or more second entities identified in the method of FIG. 5A, e.g., Clarissa 418 and Stephanie 420. In this case, the reviewed entities may be identified based on the authors, e.g., by following a "reviewed" edge from an author node to the reviewed entity. Here the relevant users are selected from users who have reviewed the entities listed in the search results 406. The second entities represent recommended entities, such as restaurants, identified by the method of FIG. 5A.

In particular embodiments, the authors may be users who are connected to one or more of the first entities identified in the method of FIG. 5A. The first entities may represent topics such as "pizza" or "Palo Alto" identified from the user's unstructured query. In this case, the reviewed entities are not directly identified by the first entities. However, there may be a path in the social graph that includes a "reviewed" edge from an author's user node to a reviewed entity, and the reviewed entity may be connected to the first entity, e.g., "pizza" or "Palo Alto". If such as path exists, then the author is a relevant user (and the reviewed entity may be included in the search results 406). For example, the social graph may be searched for users who are connected to entities by "reviewed" nodes. For each such entity, if the entity is connected to one of the first nodes, such as "pizza" or "Palo Alto", then the author may be considered a reviewing user.

Further, a connection from the entity to both of the first nodes may be required, to identify entities that are more relevant to the unstructured query, e.g., entities that are connected to nodes for both pizza and Palo Alto. At step 582, scores are generated for the author(s) based on relevance of their associated reviewed entities to the unstructured query. Step 582 may use a machine learning model with features based on the reviewed entities and the unstructured query. In one example, step 582 may at least compare the names and attributes of the reviewed entities to the words in the unstructured query, and generate a score based on the similarity, e.g., number of words in common, between each reviewed entity and the unstructured query. At step 583, the names of the identified authors are presented to the user, e.g., in the relevant users panel 416 of the news feed 402. If there are more than a small number of identified authors (e.g., 2 or 3), then the authors may be ranked by their relevance scores, and a threshold number of the highest-ranked authors may be displayed. As another example, the authors having a score greater than a threshold value may be presented. At step 584, at least a portion of the review(s) written by each displayed author is presented along with the name of the author, e.g., in the relevant users panel 416.

Particular embodiments may repeat one or more steps of the method of FIG. 5B, where appropriate. Although this disclosure describes and illustrates particular steps of the method of FIG. 5B as occurring in a particular order, this disclosure contemplates any suitable steps of the method of FIG. 5B occurring in any suitable order. Moreover, although this disclosure describes and illustrates an example method for presenting user names associated with content relevant to query results in a social-networking system including the particular steps of the method of FIG. 5B, this disclosure contemplates any suitable method for presenting user names associated with content relevant to query results in a social-networking system including any suitable steps, which may include all, some, or none of the steps of the method of FIG. 5B, where appropriate. Furthermore, although this disclosure describes and illustrates particular components, devices, or systems carrying out particular steps of the method of FIG. 5B, this disclosure contemplates any suitable combination of any suitable components, devices, or systems carrying out any suitable steps of the method of FIG. 5B.

FIG. 6 illustrates example regular expressions 600 that match recommendation requests. In particular embodiments, the classifier may determine whether the text represents a request for recommendation by searching the text for keywords or phrases, such as "anybody know" or "can someone suggest," that are likely to be present in recommendation requests. In one example, the text may be searched for the keywords or phrases, and text that contains the keywords or phrases may be considered to be a request for a recommendation or suggestions. In another example, the classifier uses a logistic regression model or other machine learning technique. A logistic regression model may produce a score indicating how likely a given string of text is to be a request for a recommendation or suggestion. The logistic regression model may be trained on a corpus of data, such as a substantial number of status updates (e.g., tens of thousands). In the training process, the status updates may be labeled as being requests for recommendations or suggestions, not requests for recommendations or suggestions, or other types of requests (e.g., "who wants to hang out tonight?), and so on. The status updates labeled as requests for recommendation are used as positive examples to train the regression model. Since there are numerous variations of words and phrases that have similar meanings, such as "anybody know", "anyone know", "any one know", and so on, the keywords or phrases can be represented in a notation that allows variations in text to be expressed without listing all the variations explicitly. Regular expressions provide such a notation, allowing the aforementioned variations of "anybody know" to be expressed as "(anybody|anyone|any one) know". Certain special characters in regular expressions have special meanings. A regular expression therefore corresponds to a set of text characters. The vertical bar separates alternatives, any of which matches the text being evaluated. The special characters \b represent a word break, which may be used to ensure that a regular expression does not match other words that contain the specified word. For example, the regular expression "\bplease\b" matches "please" but not "pleased". The special characters \s match a space or tab, and a plus sign indicates one or more occurrences, so \s+ matches one or more spaces. The "anybody know" example may therefore be written "(anybody|anyone|any one) \s+know to match text that has one or more spaces and/or tabs between the two words.

In particular embodiments, the classifier's regression model may be a linear model that assigns scores based on various weights applied to different regular expressions. If the score for a string of text is greater than a certain threshold, then the text is considered to be a recommendation request. For example, the regular expression "check (it out|my|out|this): may match text that includes the word "check" followed by one of "it out", "my", "out", or "this".

In one or more embodiments the classifier may use the regular expressions shown in FIG. 6 to identify requests for recommendations or suggestions in unstructured text. The regular expressions in FIG. 6 may be interpreted as follows. The regular expression "(email|write|text|txt|tweet|send)(to|at)?(me)?" match text that includes one of the words "email", "write", "text", "txt", "tweet", "or "send" followed by one of the optional words "to" or "at" and the optional word "me". The regular expression "(any one|any1|anyone|anybody|any body|nebody|ne1) may match text that includes one of the phrases "any one", "any1" "anyone", "anybody", "any body", "nebody", or "ne1". The regular expression "(opinions|ideas|info|thoughts)\?" may match text that includes one of the words "opinions", "ideas", "infor", or "thoughts" followed by a question mark. The regular expression "(suggest|recommend)[^\.]*\?" may match text that includes one of the words "suggest" or "recommend" followed by an optional string of periods, followed by a question mark. The regular expression "(any one|any1|anyone|anybody|any body|nebody|ne1)\s+(interested|wanna|want to|know|have)" may match text that includes one of the words "any one", "any1", "anyone", "anybody", "any body", "nebody", or "ne1" followed by one or more spaces, followed by one of the words or phrases "interested", "wanna", "want to", "know", or "have". Other regular expressions shown in FIG. 6 may be interpreted similarly.

Figure 7:
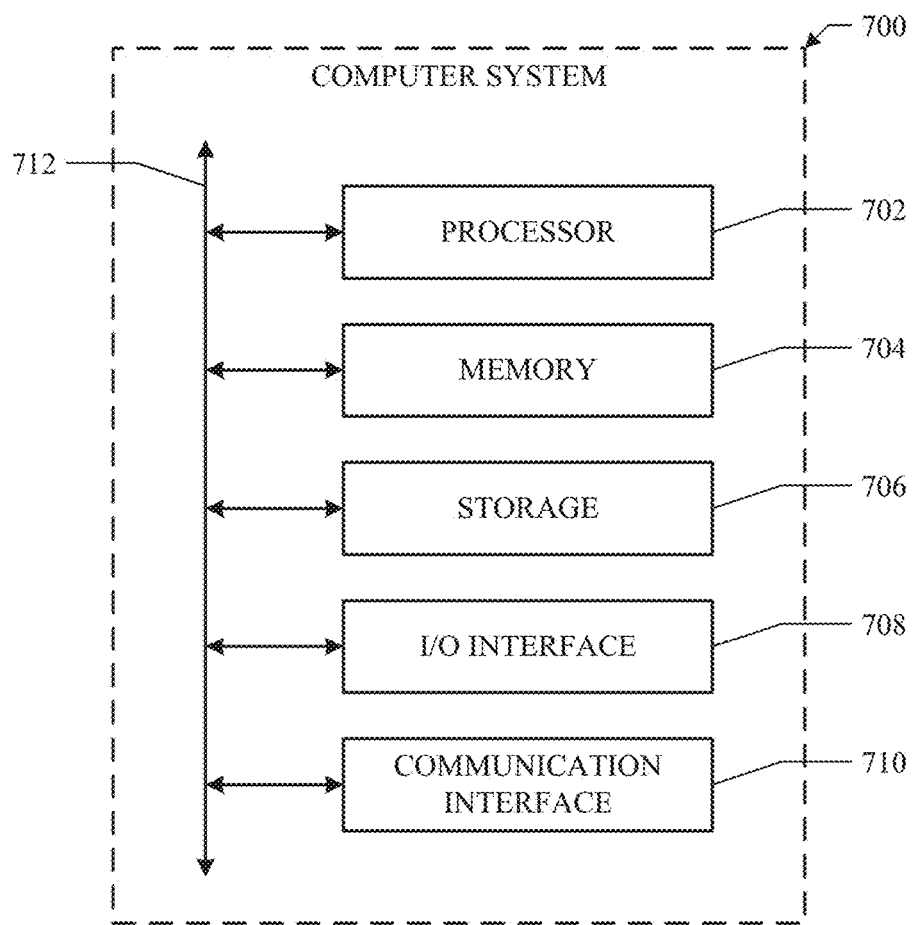
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device of a social-networking system:
   by the computing device, receiving, from a client system of a user of the social-networking system, instructions for generating a post in a news feed associated with the user on the social-networking system, wherein the post comprises unstructured text from the user;
   by the computing device, determining whether the unstructured text of the post comprises a request for a recommendation from other users of the social-networking system;

by the computing device, parsing the unstructured text to identify one or more first entities and one or more first entity types referenced in the unstructured text;

by the computing device, generating a structured query based upon the one or more first entities and the one or more first entity types referenced in the unstructured text of the post;

by the computing device, generating a plurality of search results corresponding to a plurality of second entities matching the structured query, wherein each of the second entities has an entity type matching at least one of the first entity types; and by the computing device, sending, to the client system of the user responsive to receiving the instructions for generating the post, instructions for presenting one or more of the plurality of search results, wherein the search results are presented in association with the post by the user in the news feed associated with the user.

2. The method of claim 1, wherein the post generated in the news feed associated with the user is viewable by a plurality of other users on the social-networking system.

3. The method of claim 1, wherein determining whether the unstructured text comprises a request for a recommendation comprises determining whether the unstructured text matches one or more predetermined words associated with requests for recommendation.

4. The method of claim 3, wherein determining whether the unstructured text comprises a request for a recommendation comprises:

generating a score based on the unstructured text using a machine-learning model based on comparison of the unstructured text to the one or more predetermined words associated with requests for recommendation, wherein the unstructured text comprises a request for a recommendation when the score is greater than a threshold value.

5. The method of claim 1, wherein the plurality of second entities correspond to one or more concept nodes in the social graph.

6. The method of claim 5, wherein the plurality of second entities correspond to one or more places represented by the one or more concept nodes.

7. The method of claim 1, wherein identifying the one or more first entities and the one or more first entity types referenced in the unstructured text comprises using a machine-learning topic tagger model to identify words or phrases in the unstructured text that correspond to entities and types of entities in the social graph.

8. The method of claim 1, wherein generating the structured query comprises:

combining the one or more first entities and the one or more first entity types to form a first query;

submitting the first query to a structured-query generator configured to generate the structured query based on the one or more first entities and the one or more first entity types; and receiving one or more results from the structured-query generator, wherein the structured query is based upon the one or more results.

9. The method of claim 8, further comprising identifying the plurality of second entities matching the structured query, wherein the identifying comprises:

submitting the structured query to a graph search engine configured to search the social graph for entities that match the structured query;

receiving results from the graph search engine, wherein the plurality of second entities are based on the received results.

10. The method of claim 1, wherein generating the structured query comprises:

determining whether the one or more first entities comprise a category name and a city name; and when the one or more first entities comprise a category name and a city name, generating the structured query based on the category name and the city name, wherein the structured query comprises a first constraint that selects an entity having the category name and the city name.

11. The method of claim 1, further comprising:

by the computing device, identifying one or more authors of one or more reviews of one or more reviewed entities;

by the computing device, generating one or more scores for the one or more authors based on relevance of the respective one or more reviewed entities to the structured query; and by the computing device, presenting one or more names of each of the one or more authors having a score greater than a threshold value, wherein the presenting is in a social context of the user.

12. The method of claim 11, wherein identifying one or more authors of one or more reviews of one or more reviewed entities comprises identifying, in the social graph, one or more user nodes based on a query for users who have reviewed the one or more entities in the social graph, wherein the one or more reviewed entities are identified based on the structured query.

13. The method of claim 11, wherein the one or more reviewed entities are selected from the one or more second entities.

14. The method of claim 11, further comprising:

by the computing device, presenting at least a portion of the one or more reviews in association with the one or more names of the one or more authors of the respective one or more reviews, wherein the presenting is in the social context of the user.

15. The method of claim 11, wherein the one or more authors comprise users of the social-networking system.

16. The method of claim 1, further comprising:

receiving one or more comments from one or more users; and presenting the one or more comments in association with the news feed.

17. The method of claim 1, wherein presenting the one or more of the plurality of search results comprises displaying the one or more of the plurality of search results to the user in a notification user interface in association with the unstructured query.

18. One or more computer-readable non-transitory storage media embodying software that is operable when executed to:

receive, from a client system of a user of the social-networking system, instructions for generating a post in a news feed associated with the user on the social-networking system, wherein the post comprises unstructured text from the user;

determine whether the unstructured text of the post comprises a request for a recommendation from other users of the social-networking system;

parse the unstructured text to identify one or more first entities and one or more first entity types referenced in the unstructured text;

generate a structured query based upon the one or more first entities and the one or more first entity types referenced in the unstructured text of the post;

generate a plurality of search results corresponding to a plurality of second entities matching the structured query, wherein each of the second entities has an entity type matching at least one of the first entity types; and send, to the client system of the user responsive to receiving the instructions for generating the post, instructions for presenting one or more of the plurality of search results, wherein the search results are presented in association with the post by the user in the news feed associated with the user.

19. A system comprising: one or more processors; and a memory coupled to the processors comprising instructions executable by the processors, the processors being operable when executing the instructions to:

receive, from a client system of a user of the social-networking system, instructions for generating a post in a news feed associated with the user on the social-networking system, wherein the post comprises unstructured text from the user;

determine whether the unstructured text of the post comprises a request for a recommendation from other users of the social-networking system;

parse the unstructured text to identify one or more first entities and one or more first entity types referenced in the unstructured text;

generate a structured query based upon the one or more first entities and the one or more first entity types referenced in the unstructured text of the post;

generate a plurality of search results corresponding to a plurality of second entities matching the structured query, wherein each of the second entities has an entity type matching at least one of the first entity types; and send, to the client system of the user responsive to receiving the instructions for generating the post, instructions for presenting one or more of the plurality of search results, wherein the search results are presented in association with the post by the user in the news feed associated with the user.

20. The system of claim 19, wherein the post generated in the news feed associated with the user is viewable by a plurality of other users on the social-networking system.

21. The system of claim 19, wherein the instructions to determine whether the unstructured text comprises a request for a recommendation comprises instructions to determine whether the unstructured text matches one or more predetermined words associated with requests for recommendation.

22. The system of claim 21, wherein the instructions to determine whether the unstructured text comprises a request for a recommendation comprises instructions to:

generate a score based on the unstructured text using a machine-learning model based on comparison of the unstructured text to the one or more predetermined words associated with requests for recommendation, wherein the unstructured text comprises a request for a recommendation when the score is greater than a threshold value.

23. The system of claim 19, wherein the plurality of second entities correspond to one or more concept nodes in the social graph.

24. The system of claim 23, wherein the plurality of second entities correspond to one or more places represented by the one or more concept nodes.

25. The system of claim 19, wherein the instructions to identify the one or more first entities and the one or more first entity types referenced in the unstructured text comprises instructions to use a machine-learning topic tagger model to identify words or phrases in the unstructured text that correspond to entities and types of entities in the social graph.

26. The system of claim 19, wherein the instructions to generate the structured query comprises instructions to:

combine the one or more first entities and the one or more first entity types to form a first query;

submit the first query to a structured-query generator configured to generate the structured query based on the one or more first entities and the one or more first entity types; and receive one or more results from the structured-query generator, wherein the structured query is based upon the one or more results.

27. The system of claim 26, wherein the processors are further operable when executing instructions to identify the plurality of second entities matching the structured query, wherein the identifying comprises:

submitting the structured query to a graph search engine configured to search the social graph for entities that match the structured query;

receiving results from the graph search engine, wherein the plurality of second entities are based on the received results.

28. The system of claim 19, wherein the instructions to generate the structured query comprises instructions to:

determine whether the one or more first entities comprise a category name and a city name; and when the one or more first entities comprise a category name and a city name, generate the structured query based on the category name and the city name, wherein the structured query comprises a first constraint that selects an entity having the category name and the city name.

29. The system of claim 19, wherein the processors are further operable when executing instructions to:

identify one or more authors of one or more reviews of one or more reviewed entities;

generate one or more scores for the one or more authors based on relevance of the respective one or more reviewed entities to the structured query; and present one or more names of each of the one or more authors having a score greater than a threshold value, wherein the presenting is in a social context of the user.

30. The system of claim 29, wherein the instructions to identify one or more authors of one or more reviews of one or more reviewed entities comprises instructions to identify, in the social graph, one or more user nodes based on a query for users who have reviewed the one or more entities in the social graph, wherein the one or more reviewed entities are identified based on the structured query.

31. The system of claim 29, wherein the one or more reviewed entities are selected from the one or more second entities.

32. The system of claim 29, wherein the processors are further operable when executing instructions to:

present at least a portion of the one or more reviews in association with the one or more names of the one or more authors of the respective one or more reviews, wherein the presenting is in the social context of the user.

33. The system of claim 29, wherein the one or more authors comprise users of the social-networking system.

34. The system of claim 19, wherein the processors are further operable when executing instructions to:
- receive one or more comments from one or more users; and
- present the one or more comments in association with the news feed.

35. The system of claim 19, wherein the instructions for presenting the one or more of the plurality of search results comprises instructions for displaying the one or more of the plurality of search results to the user in a notification user interface in association with the unstructured query.

* * * * *